(12) United States Patent
Kotecha

(10) Patent No.: US 9,094,961 B2
(45) Date of Patent: *Jul. 28, 2015

(54) SYSTEM AND METHOD FOR RESOURCE BLOCK-SPECIFIC CONTROL SIGNALING

(71) Applicant: Apple Inc., Cupertino, CA (US)

(72) Inventor: Jayesh H. Kotecha, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/944,176

(22) Filed: Jul. 17, 2013

(65) Prior Publication Data

US 2014/0050195 A1 Feb. 20, 2014

Related U.S. Application Data

(63) Continuation of application No. 11/742,204, filed on Apr. 30, 2007, now Pat. No. 8,547,986.

(51) Int. Cl.
*H04J 3/26* (2006.01)
*H04W 72/04* (2009.01)
*H04B 7/04* (2006.01)
*H04L 5/00* (2006.01)
*H04L 27/26* (2006.01)

(52) U.S. Cl.
CPC ......... *H04W 72/0406* (2013.01); *H04B 7/0417* (2013.01); *H04L 5/0007* (2013.01); *H04L 5/0037* (2013.01); *H04L 5/0094* (2013.01); *H04L 27/2601* (2013.01)

(58) Field of Classification Search
CPC .......................... H04B 7/0417; H04B 7/0637
USPC ........................................................ 370/432
See application file for complete search history.

(56) References Cited

U.S. PATENT DOCUMENTS

| 7,016,319 | B2 * | 3/2006 | Baum et al. ................... 370/329 |
| 2005/0135324 | A1 * | 6/2005 | Kim et al. ..................... 370/343 |
| 2007/0010268 | A1 * | 1/2007 | Kim et al. ..................... 455/509 |
| 2007/0165731 | A1 * | 7/2007 | Xiao et al. .................... 375/260 |

* cited by examiner

*Primary Examiner* — Mark Rinehart
*Assistant Examiner* — Matthew Hopkins
(74) *Attorney, Agent, or Firm* — Meyertons, Hood, Kivlin, Kowert & Goetzel, P.C.

(57) ABSTRACT

A system and method is disclosed for resource block-specific control signaling in a communication system. Communication data is transmitted using a transmission channel comprising a plurality of resource blocks defined by allocating time-frequency slots in a transmission resource. Resource block control information is transmitted in a "feed-forward" manner to a user end (UE) or group of UEs using channels physically mapped into scheduled resource blocks (RBs) for that user or group of users. Embodiments of the invention provide an RB-specific control channel that comprises RB control elements that are embedded within scheduled resource blocks. The invention, therefore, reduces the amount of control information that must be transmitted by common or shared control channels.

17 Claims, 6 Drawing Sheets

SYSTEM AND METHOD FOR RESOURCE BLOCK-SPECIFIC CONTROL SIGNALING

PRIORITY CLAIM

This application is a continuation of and claims the benefit of priority from U.S. patent application Ser. No. 11/742,204, entitled "System and Method for Resource Block-Specific Control Signaling" and filed on Apr. 30, 2007, which is fully incorporated herein by reference for all purposes.

BACKGROUND

1. Field of the Application

The present invention is directed in general to the field of information processing. In one aspect, the present invention relates to a system and method for providing resource block-specific control signaling in a communication system.

2. Background of the Disclosure

Wireless communication systems transmit and receive signals within a designated electromagnetic frequency spectrum, but the capacity of the electromagnetic frequency spectrum is limited. As the demand for wireless communication systems continues to expand, there are increasing challenges to improve spectrum usage efficiency. To improve the communication capacity of the systems while reducing the sensitivity of the systems to noise and interference and limiting the power of the transmissions, a number of wireless communication techniques have been proposed.

FIG. 1 depicts a wireless communication system 100 in which a transmitter 102 having a single antenna or an array of antennas 106 communicates with receiver 104 having a single antenna or an array of antennas 108. The communication system 100 may be any type of wireless communication system including, but not limited to, a Multiple Input, Multiple Output (MIMO) system, a Space Division Multiple Access (SDMA) system, a Code Division Multiple Access (CDMA) system, an Orthogonal Frequency Division Multiplexing (OFDM) system, or an Orthogonal Frequency Division Multiple Access (OFDMA) system. In the communication system 100, the transmitter 102 may act as a base station, while the receiver 104 acts as a subscriber station, which can be virtually any type of wireless one-way or two-way communication device such as a cellular telephone, wireless equipped computer system, and wireless personal digital assistant. Of course, the receiver/subscriber station 104 can also transmit signals which are received by the transmitter/base station 102. The signals communicated between transmitter 102 and receiver 104 can include voice, data, electronic mail, video, and other data, voice, and video signals. In operation, the transmitter 102 transmits a signal data stream (e.g., signal $s_1$) through one or more antennas 106 and over a channel $H_1$ to a receiver 104, which combines the received signal from one or more receive antennas 108 to reconstruct the transmitted data. To transmit the signal vector $s_1$, the transmitter 102 prepares a transmission signal, represented by the vector $x_1$, for the signal $s_1$. (Note: lower case bold variables indicate vectors and upper case BOLD variables indicate matrices). The transmission signal vector $x_1$ is transmitted via a channel represented by a channel matrix $H_1$, and is received at the receiver 104 as a receive signal vector $y_1 = H_1 x_1 + n_1$ (where n represents co-channel interference or noise). The channel matrix $H_1$ represents a channel gain between the transmitter antenna array 106 and the subscriber station antenna array 108. Thus, the channel matrix $H_1$ can be represented by a k×N matrix of complex coefficients, where N is the number of antennas in the transmitter/base station antenna array 106 and k is the number of antennas in the receiver/subscriber station antenna array 108. The value of k can be unique for each receiver/subscriber station. As will be appreciated, the channel matrix $H_1$ can instead be represented by a N×k matrix of complex coefficients, in which case the matrix manipulation algorithms are adjusted accordingly so that, for example, the right singular vector calculation on a k×N channel matrix becomes a left singular vector calculation on a N×k channel matrix. The coefficients of the channel matrix $H_1$ depend, at least in part, on the transmission characteristics of the medium, such as air, through which a signal is transmitted. A variety of methods may be used at the receiver to determine the channel matrix $H_1$ coefficients, such as transmitting a known pilot signal to a receiver so that the receiver, knowing the pilot signal, can estimate the coefficients of the channel matrix $H_1$ using well-known pilot estimation techniques. Alternatively, when the channel between the transmitter and receiver are reciprocal in both directions, the actual channel matrix $H_1$ is known to the receiver and may also be known to the transmitter.

Current efforts to develop communication systems based on the Third Generation Partnership Project (3GPP) Long-Term Evolution (LTE) standard provide various mechanisms for transmitting "feed-forward" control information for transmission of data over an allocated time-frequency slot of a predetermined portion of a transmission resource in a frequency band. This time-frequency slot of the transmission resource is often referred to as a "resource block" (RB). In current LTE implementations, feed-forward control information to a user end (UE) or a group of UEs is based on the use of common control channels or shared control channels to provide, among other things, information regarding the mapping of a user or users to a resource block in an allocated physical resource. (As used herein, "common/shared control channel" will be used to refer to either a common control channel or a shared control channel.) The common/shared control channel is also used to transmit control information that is specific to various resource blocks. For example, the common/shared control channel may be used to provide modulation coding information, layering information, transmission rank information or precoding matrix information, etc. In general, current implementations of common/shared control channels are inefficient because resource block-specific information is fed forward in the common/shared control channel with a large number of overhead bits being required to indicate the resource block index and the related control information. As will be understood by those of skill in the art, as the number of bits in the common/shared control channel element increases, there is a decrease in the number of users that can be serviced. This inefficiency is exacerbated in multiple-input multiple-output (MIMO) communication systems because redundant information is embedded in the common/shared control channel elements for multiple users.

Accordingly, there is a need for a feed-forward control mechanism that provides control information whereby resource block-specific information is fed forward more efficiently. Specifically, it would be advantageous to provide a system and method whereby only targeted users scan the given scheduled resource block or physical channel in a non-blind manner to utilize a resource block. Further limitations and disadvantages of conventional processes and technologies will become apparent to one of skill in the art after reviewing the remainder of the present application with reference to the drawings and detailed description which follow.

BRIEF DESCRIPTION OF THE DRAWINGS

The present invention may be understood, and its numerous objects, features and advantages obtained, when the following detailed description of a preferred embodiment is considered in conjunction with the following drawings, in which.

Figure 1:
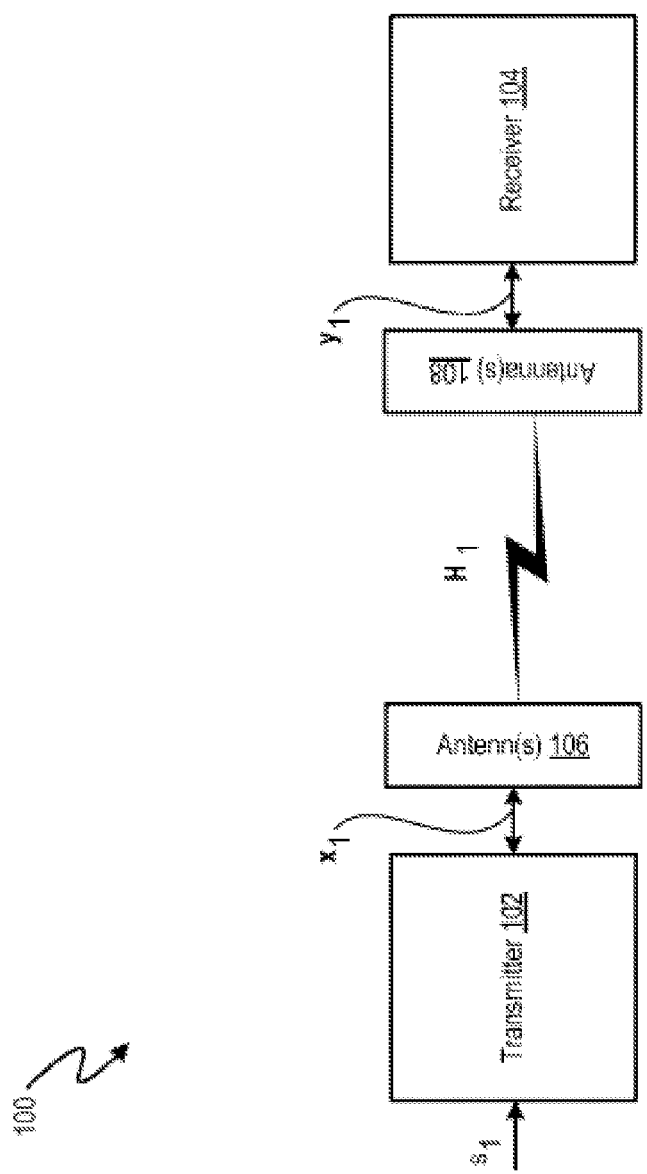
FIG. 1 (labeled prior art) depicts a wireless communication system.

It will be appreciated that for simplicity and clarity of illustration, elements illustrated in the drawings have not necessarily been drawn to scale. For example, the dimensions of some of the elements are exaggerated relative to other elements for purposes of promoting and improving clarity and understanding. Further, where considered appropriate, reference numerals have been repeated among the drawings to represent corresponding or analogous elements.

DETAILED DESCRIPTION

A system and methodology are disclosed for providing resource block (RB)-specific control information to a user end (UE) or a group of UEs. The embodiments of the invention disclosed herein can be implemented in single antenna communication systems or in communication systems wherein the transmitter and/or the receiver comprise multiple antennas. This invention provides a mechanism for transmitting "feed forward" control information to a user end (UE) or group of UEs using channels physically mapped into a scheduled resource block (RB) for that user or group of users. More specifically, the present invention defines an RB-specific control channel that is physically mapped into an allocated physical resource. Thus the RB-specific control channel is embedded within the scheduled resource block. The control information that the RB-specific control channel carries comprises RB-specific control information.

In the present invention, this RB-specific control channel is used to reduce the data overhead of a common-control channel or shared-control channel used in current systems. In current systems, RB-specific control information is fed forward in the common/shared control channel, thereby increasing the size of the data that must be transmitted in the common/shared control channel. Additional transmission overhead may be added for data bits that are required to indicate the resource block index. The system and method of the present invention reduces the amount of RB-specific information transmitted in the common/shared control channel and, therefore, allows more UEs to be allocated in the common/shared control channel. In communication systems where multiple UEs are assigned or scheduled for the same resource in a MIMO communication system, all of the UEs can read this RB-specific control information and save bandwidth compared to a system wherein this signaling information is embedded in a common control channel.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art.

Figure 2:
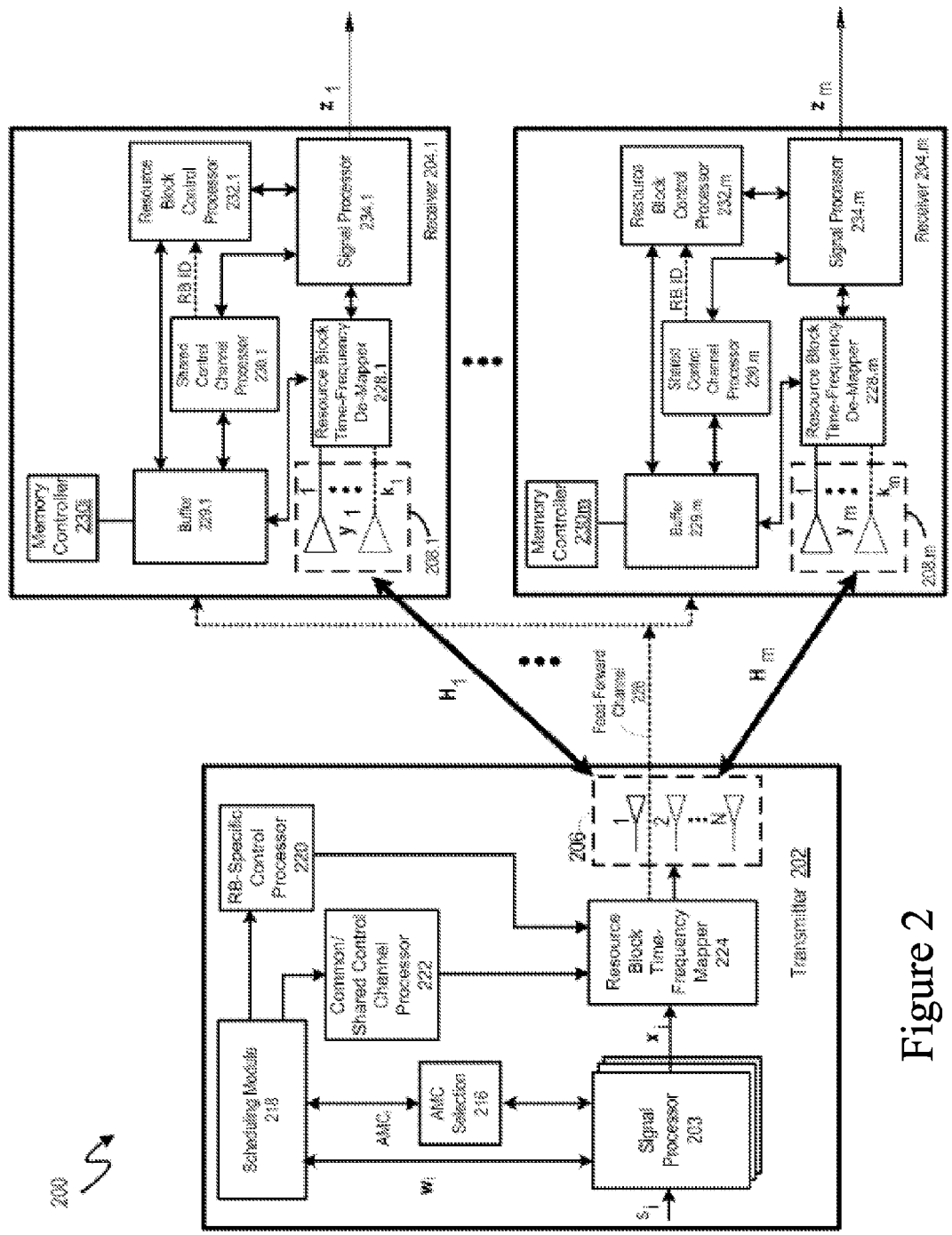
FIG. 2 depicts a wireless communication system in which resource block control information is provided to a plurality of UEs via a feed-forward channel.
Figure 3A:
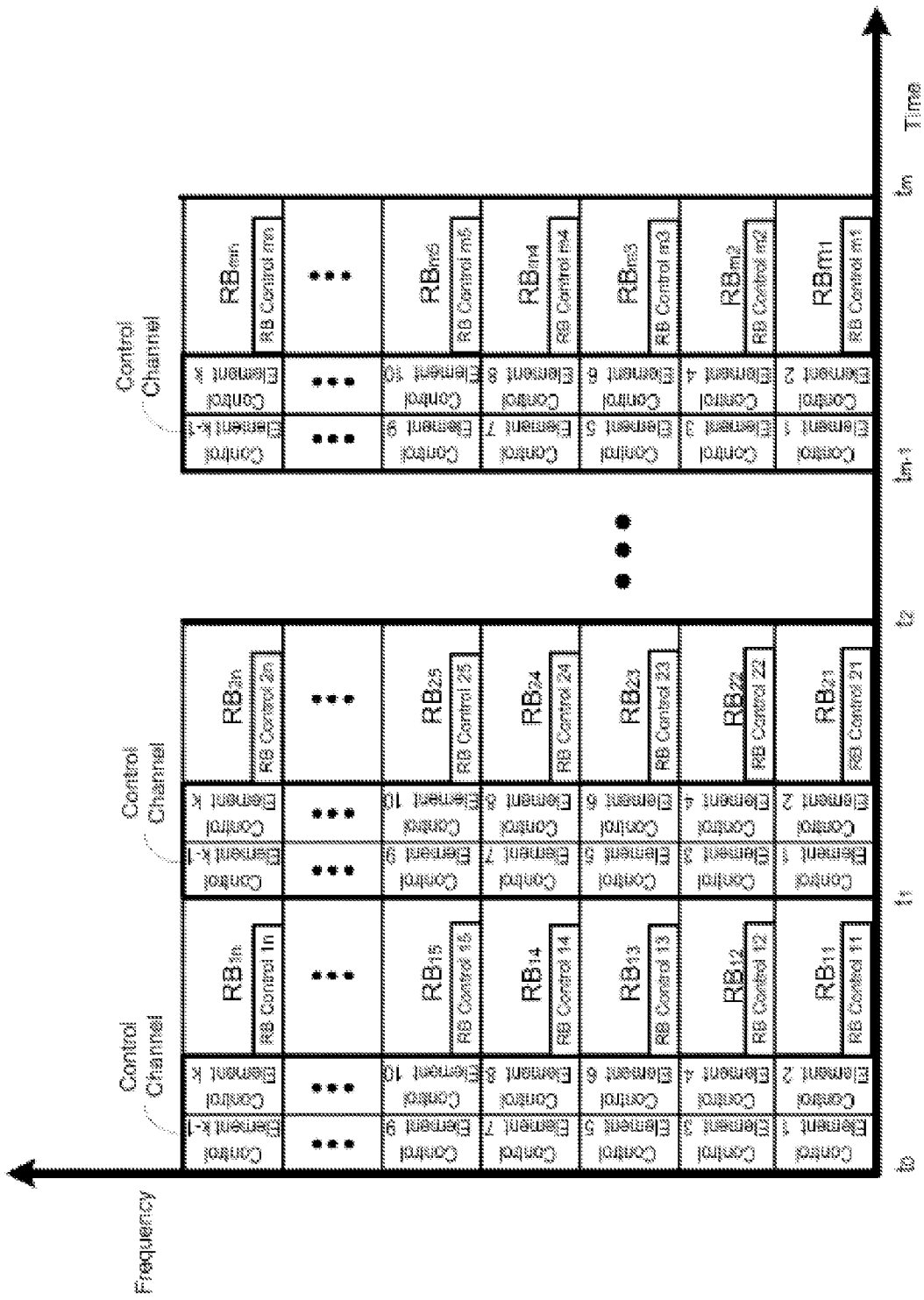
FIG. 3a is an illustration of an allocation of time-frequency resources to a plurality of UEs in a communication system in accordance with the present invention.
Figure 3B:
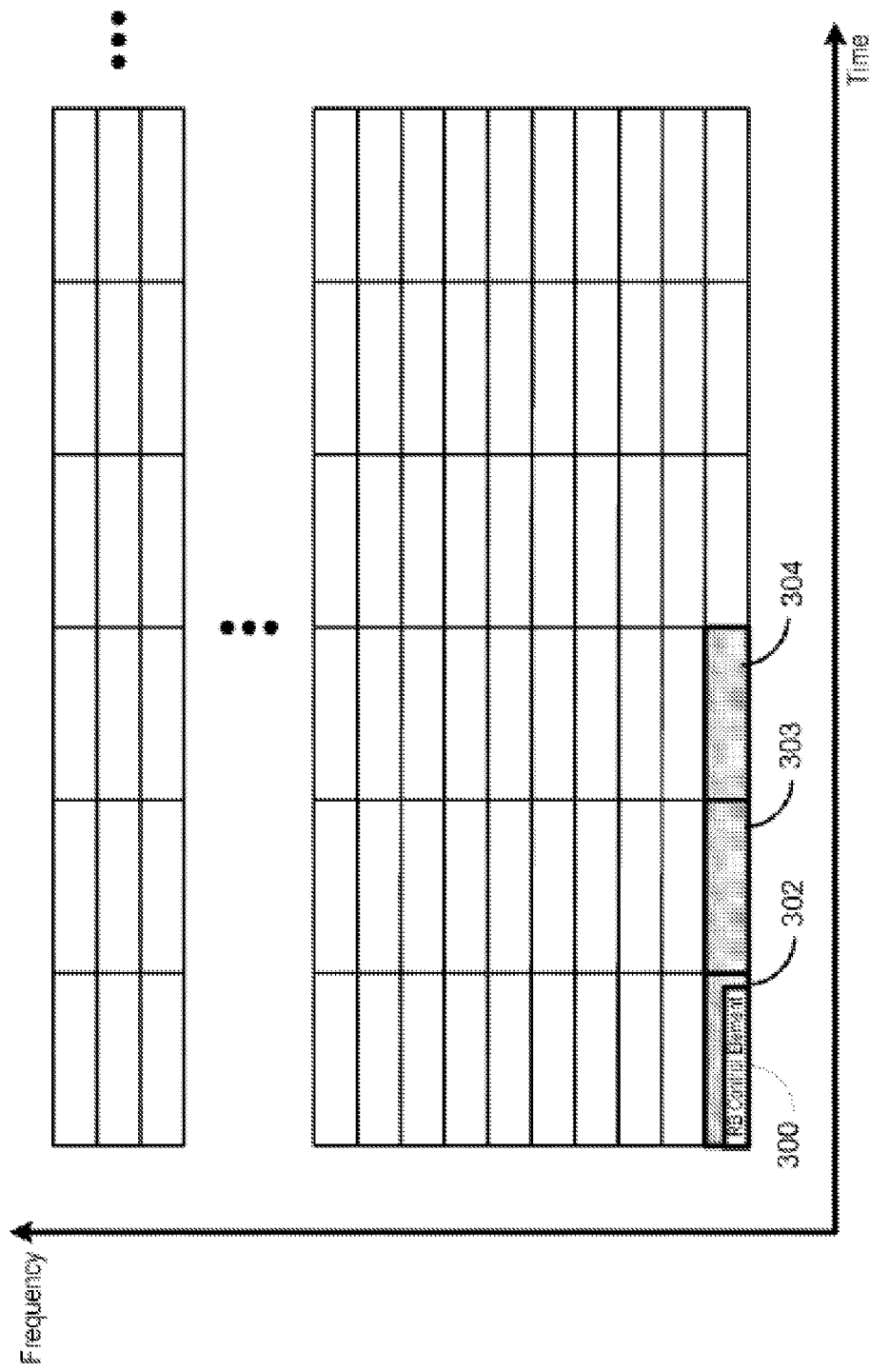
FIG. 3b is an illustration of an embodiment of the invention wherein a single resource control element provides control information for a plurality of resource blocks at a single subcarrier frequency over a plurality of successive time intervals.
Figure 3C:
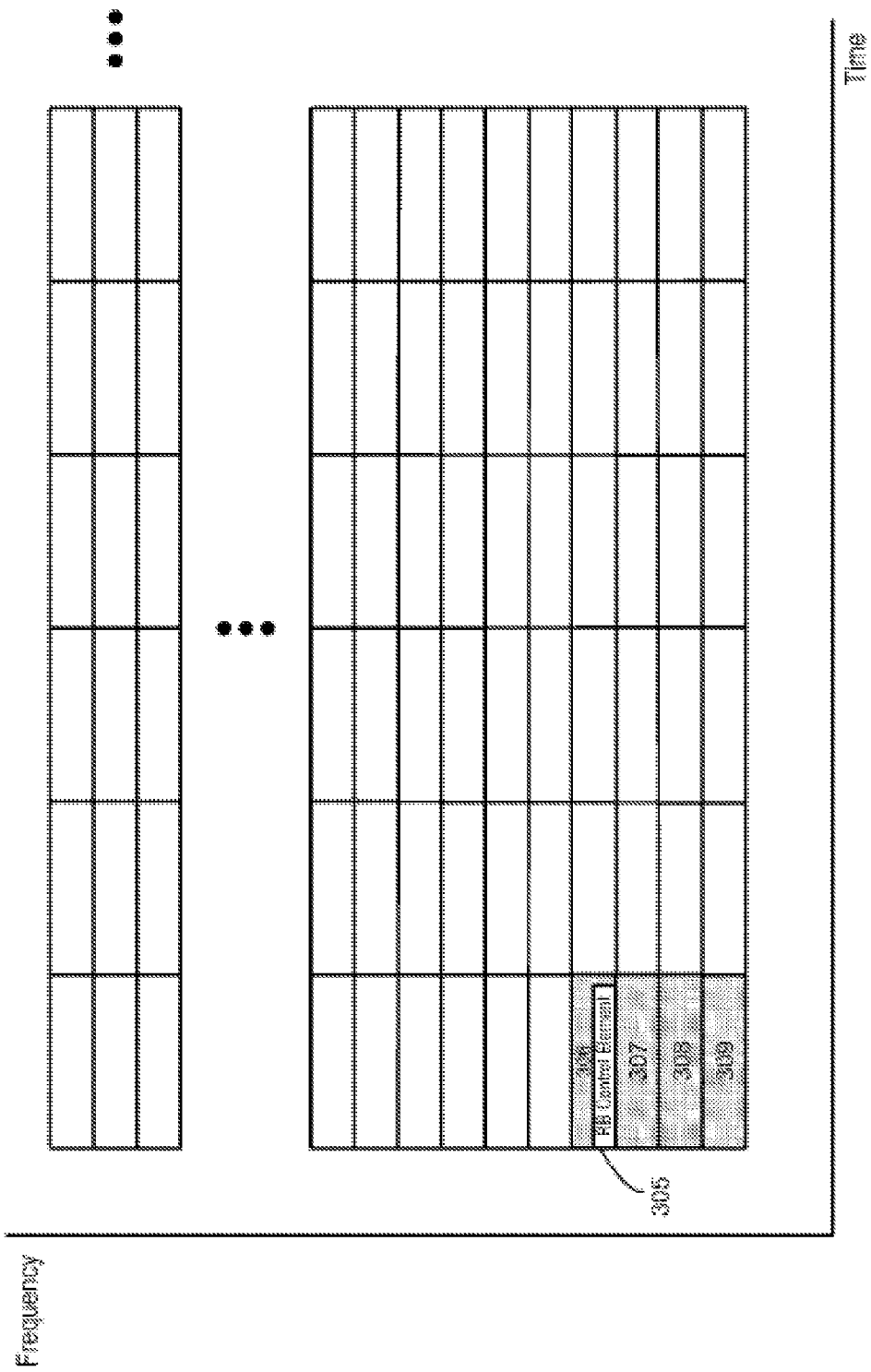
FIG. 3c is an illustration of an embodiment of the invention wherein a single resource control element provides control information for a plurality of resource blocks at multiple subcarrier frequencies over a single time interval.
Figure 3D:
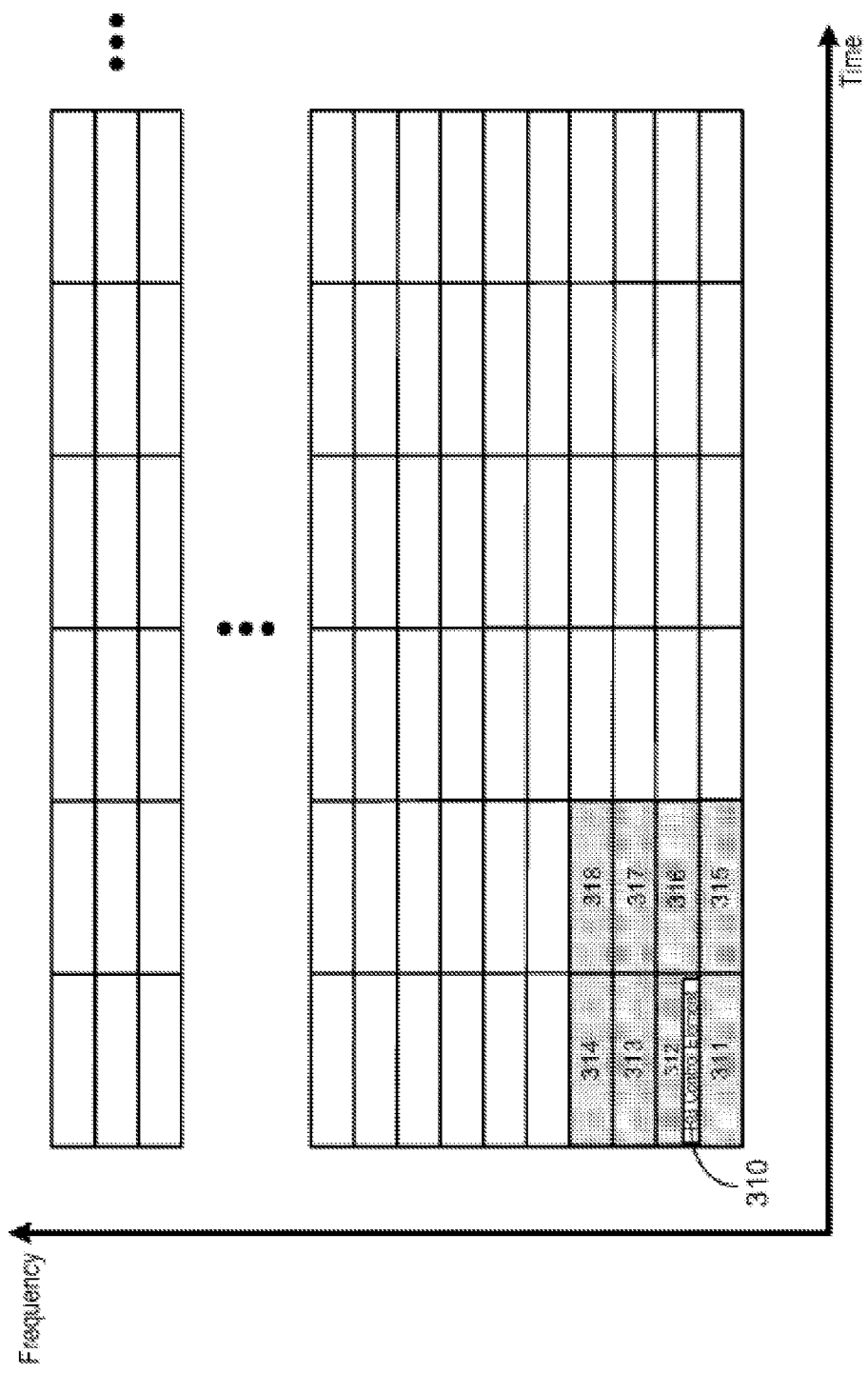
FIG. 3d is an illustration of an embodiment of the invention wherein a single resource control element provides control information for a plurality of resource blocks at a plurality of subcarrier frequencies over a plurality of successive time intervals.

FIG. 2 depicts a wireless communication system 200 in which a transmitter 202 uses the resource block control techniques described herein to configure or adapt one or more input signals that are transmitted from a transmitter 202 (e.g., a base station) to one or more receivers 204.1-204.m (e.g., subscriber stations). The transmitter 202 includes a single antenna or an array of antennas 206 for communicating with the receivers 204.1-m. The receivers 204.1-m, may comprise a single antenna or an array of antennas 208.i for communicating with the transmitter 202. In operation, a data signal $s_i$ presented at the transmitter 202 for transmission to the receiver 204.i is transformed by the signal processor 203.i into a transmission signal represented by the vector $x_i$. The signals transmitted from the transmit antenna 206 propagate through a matrix channel $H_i$ and are received by the receive antennas 208.i where they are represented by the vector $y_i$. For a channel from the transmitter 202 to the $i^{th}$ receiver 204.i, the channel is denoted by $H_i$, $\epsilon \{1, 2, \ldots, m\}$. The channel matrix $H_i$ may be represented as a $k_i \times N$ matrix of complex entries representing the complex coefficients of the transmission channel between each transmit-receive antenna pair, where N represents the number of antennas of the transmitter 202 and $k_i$ represents the number of antennas of the $i^{th}$ receiver 204.i. At the receiver 204.i, the signal processing unit 210.i processes the $y_i$ signals received on the k antennas to obtain a data signal, $z_i$, which is an estimate of the transmitted data $s_i$.

The channel matrix $H_i$ specifies the transmission channel between a transmitter and an $i^{th}$ receiver. For example, in a MIMO implementation, each receiver 204.1-m determines its MIMO channel matrix $H_i$ by using pilot estimation or sounding techniques to determine or estimate the coefficients of the channel matrix $H_i$.

In embodiments of the present invention, data is transmitted via the matrix H.sub.i using a plurality of resource blocks (RBs) that represent the allocation of time-frequency transmission resources within a predetermined frequency band. In various embodiments of the invention, the RBs are used to transmit data symbols, common/shared control channel information, and RB-specific control information. The resource blocks are generated by the signal processor 203, the Adaptive Modulation Coding (AMC) selection module 216, and the scheduling module 218, using techniques known to those of skill in the art. RB-specific control signal information associated with predetermined RBs transporting the data symbols is generated by RB-specific control processor 220. Common/shared control channel processor 222 is operable to generate control information associating predetermined UEs with one or more designated RBs, as described in more detail herein below. The resource block time-frequency mapper 224 generates a mapping of data symbol, common channel control information and RB-specific control information onto an allocated physical transmission resource.

Those of skill in the art will understand that the data symbols, the common/shared control information and the RB-specific control information are transmitted between the transmitter 202 and an $i^{th}$ receiver over a transmission channel denoted by the channel matrix H. To simplify the discussion of the various embodiments of the invention, various well-understood processing modules in the receivers 204.$i$ are not explicitly shown, but are understood to be included.

Feed-forward channel 226 represents a physical feed-forward channel that transmits shared/common channel information, RB mapping information and RB-specific control information to the receivers 204.$i$. Incoming RBs are processed by a resource block time-frequency demapper 228.$i$ and are stored in a buffer 229.$i$. Common/shared channel information stored in the buffer 229.$i$ is decoded by the shared channel processor 230.$i$ and the resource block control processor 232.$i$. Specifically, the shared channel processor 230.$i$ is operable to decode a plurality of shared channel control elements to locate specific control elements that correspond to a specific UE. The shared channel control element for a specific UE comprises a resource block allocation identifier that designates a specific resource block, or set of resource blocks, that provides a physical resource for transmitting data for that UE. Once the resource block allocation identifier has been decoded, the signal processing/channel estimation processor 234.$i$ is operable to process resource block-specific control information that is decoded by the resource block control processor 232.$i$. Resource block control signal data embedded in one or more predetermined resource blocks is then extracted by the signal processor 234.$i$ and is used to process data received by the receiver 204.$i$ from the transmitter 202.

FIG. 3$a$ is an illustration of an allocation of time-frequency resources to a plurality of UEs in a communication system in accordance with the present invention. A frequency band comprising a plurality of subcarriers is operable to transmit data for a plurality of UEs over predetermined time intervals $t_0$-$t_m$. As will be understood by those of skill in the art, each of the RBs shown in FIG. 3$a$ represent a time-frequency allocation of transmission resources that may comprise a plurality of subcarriers within a frequency band. The subcarriers may be discontiguous, (i.e., non adjacent to each other). In the embodiment shown in FIG. 3$a$, control channel elements 1-k are transmitted during each of the time intervals $t_0$-$t_m$. In prior art communication systems, the control elements typically comprise a large number of bits, including bits comprising specific control information for predetermined RBs.

As will be understood by those of skill in the art, UEs typically must decode each of the control elements shown in FIG. 3$a$ until they locate a specific control element that includes their UE identifier and a comparatively large number of bits comprising control channel information for the associated resource block. This large number of overhead bits in the control elements severely restricts the number of users that can be served by the communication channel. In an embodiment of the present invention, each of the control elements comprises a UE identifier and an associated resource block allocation identifier. In the embodiment shown in FIG. 3$a$, predetermined resource blocks $RB_{11}$-$RB_{mn}$ comprise embedded resource block control elements, RB Control$_{11}$-RB Control$_{mn}$ that provide resource block-specific control information. The processing logic discussed above in connection with FIG. 2 is operable to decode the control elements 1-k to extract resource block allocation identifier. This resource block allocation identifier is then used to identify the embedded resource block control element, e.g., RB Control$_1$4 in the associated resource block, e.g., $RB_1$4 to that is used by signal processor 234.$i$ to process data received by receiver 204.$i$ from transmitter 202. It will be appreciated by those of skill in the art that multiple UEs can decode the RB-specific control if they are assigned to the corresponding RB. The RB-specific control information included in the resource block control element can comprise virtually any type of control information used in OFDM communication systems. For example the RB-specific control information may include transmission rank information that specifies the number of layers used to transmit the data through a MIMO channel. The RB-specific information also may include layering information specifying how the data streams are mapped onto the layers of a MIMO channel. In addition, or alternatively, the RB-specific information may include preceding matrix index information (PMI). Since the resource block control information is not stored in the common/shared control channel elements, a larger number of users can be serviced using the same amount of bandwidth in the common/shared control channel.

In some embodiments of the invention, a single resource block control element can be used to provide RB-specific control information for a plurality of associated resource blocks to create a set of associated resource blocks, sometimes referred to as a resource block "chunk." For example, as shown in FIG. 3$b$, a single resource block control element 300 can be used to provide RB-specific control information for RBs 302, 303, and 304 at an RB over three successive time intervals. In the embodiment shown in FIG. 3$c$, a single resource block control element 305 is used to provide RB-specific control information for RBs 306, 307, 308, and 309 during a single time interval. In the embodiment shown in FIG. 3$d$, a single resource block control element 310 is used to provide RB-specific control information for RBs 311-318 during multiple time intervals. The association of the individual RBs comprising the resource block chunks can be accomplished using the RB-specific control processor 220 and the common/shared control channel processor 222 shown in FIG. 2.

By now it should be appreciated that there has been provided description of a method and system resource block-specific control signaling in a communication system. In one aspect of the invention, a method for processing signals in a communication system comprises: transmitting data using a plurality of resource blocks within a predetermined frequency band; embedding a resource block control element in individual resource blocks within said plurality of resource blocks, wherein each embedded resource block control element comprises predetermined control information for the resource block in which the resource block control element is embedded; transmitting a plurality of common/shared control channel control elements corresponding to a predetermined set of users, wherein individual control elements comprise a user identifier and an associated resource block allocation identifier; and using said resource block allocation identifier to decode said predetermined control information for said resource block associated with said user.

In another aspect of the invention, a transmitter for use in a wireless communication system comprises: signal processing logic operable to generate a transmission channel comprising a plurality of resource blocks within a predetermined frequency band; a resource block encoder operable to embed a resource block control element in individual resource blocks within said plurality of resource blocks, wherein each embedded resource block control element comprises predetermined control information for the resource block in which the resource block control element is embedded; and a common/shared control channel encoder operable to generate a plurality of common/shared control channel control elements corresponding to a predetermined set of users, wherein individual control elements comprise a user identifier and an associated resource block allocation identifier; wherein said resource block allocation identifier is correlated with said predetermined control information for said resource block associated with said user.

In yet another aspect of the invention, a receiver for use in a wireless communication system, comprises: signal processing logic operable to receive a data transmission signal comprising a plurality of resource blocks within a predetermined frequency band; a resource block control processor operable to extract a resource block control element from individual resource blocks within said plurality of resource blocks, wherein each embedded resource block control element comprises predetermined control information for the resource block in which the resource block control element is embedded; a common/shared control channel processor operable to extract a plurality of common/shared control channel control elements corresponding to a predetermined set of users, wherein individual control elements comprise a user identifier and an associated resource block allocation identifier; and processing logic operable to use said resource block allocation identifier to decode said predetermined control information for said resource block associated with said user.

The methods and systems for providing resource block-specific control signaling in a communication system as shown and described herein may be implemented in hardware or in software stored on a computer-readable medium and executed as a computer program on a general purpose or special purpose computer to perform certain tasks. For a hardware implementation, the elements used to perform various signal processing steps at the transmitter and/or at the receiver may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. In addition or in the alternative, a software implementation may be used, whereby some or all of the signal processing steps at each of the transmitter and receiver may be implemented with modules (e.g., procedures, functions, and so on) that perform the functions described herein. It will be appreciated that the separation of functionality into modules is for illustrative purposes, and alternative embodiments may merge the functionality of multiple software modules into a single module or may impose an alternate decomposition of functionality of modules. In any software implementation, the software code may be executed by a processor or controller, with the code and any underlying or processed data being stored in any machine-readable or computer-readable storage medium, such as an on-board or external memory unit.

Although the described exemplary embodiments disclosed herein are directed to various communications systems and methods for using same, the present invention is not necessarily limited to the example embodiments illustrate herein. For example, various embodiments of a communication system disclosed herein may be implemented in connection with various proprietary or wireless communication standards, such as IEEE 802.16e, 3GPP-LTE, DVB and other systems. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A receiver for use in a wireless communication system, comprising:
   a receiver operable to receive a data transmission signal comprising a plurality of resource blocks within a predetermined frequency band;
   a resource block control processor operable to extract a resource block control element from individual resource blocks within the plurality of resource blocks, wherein a plurality of resource block control elements are embedded in a corresponding plurality of individual resource blocks, wherein each embedded resource block control element comprises predetermined control information for the resource block in which the resource block control element is embedded; and
   a control channel processor operable to extract a plurality of control channel control elements corresponding to a predetermined set of users, wherein individual control elements comprise a user identifier and an associated resource block allocation identifier, wherein the resource block allocation identifier is used to process the predetermined control information for the resource block associated with the user.

2. The receiver of claim 1, wherein the communication system implements orthogonal frequency division multiplexing.

3. The receiver of claim 1, wherein the communication system implements orthogonal frequency division multiple access.

4. The receiver of claim 1, wherein the embedded resource block control information comprises transmission rank information.

5. The receiver of claim 1, wherein the embedded resource block control information comprises preceding matrix information.

6. The receiver of claim 1, wherein the embedded resource block control information comprises layering information, wherein multiple layers are transmitted.

7. The receiver of claim 1, wherein the communication system comprises a multi-user and the individual resource blocks are scheduled for multiple users simultaneously.

8. The receiver of claim 1, wherein a resource block control element in a first individual resource block further comprises control information for a predetermined second resource block.

9. An apparatus for processing received data in a wireless communication system, comprising:
- a receiver operable to receive a data transmission signal comprising a plurality of resource blocks;
- a processor operable to extract a plurality of common control channel control elements, wherein at least one of the common control elements comprises one or more user identifiers and one or more associated resource block allocation identifiers;
- a processor operable to extract a resource block allocation identifier, based on a first user identifier;
- a processor operable to identify a resource block control element specific to the resource block associated with the resource block allocation identifier, wherein a plurality of resource block control elements are embedded in corresponding resource blocks of the plurality of resource blocks; and
- a processor operable to extract the resource block control element to process the resource blocks associated with the resource block control element.

10. A method of processing received data in a wireless communication system, comprising:
- receiving a data transmission signal comprising a plurality of resource blocks within a predetermined frequency band;
- using a resource block control processor to extract a resource block control element from individual resource blocks within said plurality of resource blocks, wherein a plurality of resource block control elements are embedded in a corresponding plurality of individual resource blocks, wherein each embedded resource block control element comprises predetermined control information for the resource block in which the resource block control element is embedded;
- using a control channel processor to extract a plurality of control channel control elements corresponding to a predetermined set of users, wherein individual control elements comprise a user identifier and an associated resource block allocation identifier; and
- using said resource block allocation identifier to process said predetermined control information for said resource block associated with said user.

11. The method of claim 10, wherein the communication system implements orthogonal frequency division multiplexing.

12. The method of claim 10, wherein the communication system implements orthogonal frequency division multiple access.

13. The method of claim 10, wherein the embedded resource block control information comprises transmission rank information.

14. The method of claim 10, wherein the embedded resource block control information comprises precoding matrix information.

15. The method of claim 10, wherein the embedded resource block control information comprises layering information, wherein multiple layers are transmitted.

16. The method of claim 10, wherein said communication system comprises a multi-user and said individual resource blocks are scheduled for multiple users simultaneously.

17. The method of claim 10, wherein a resource block control element in a first individual resource block further comprises control information for a predetermined second resource block.

\* \* \* \* \*